Patented Oct. 23, 1951

2,572,284

UNITED STATES PATENT OFFICE 2,572,284

PARA-AMINO, GAMMA RESORCYLIC ACID AND SALTS, AND PROCESS FOR MANUFACTURE

Karl Schoen, Kew Gardens, N. Y., assignor to Endo Products, Inc., Richmond Hill, N. Y., a corporation of New York No Drawing. Application October 21, 1949, Serial No. 122,867

7 Claims. (Cl. 260—519)

This invention relates to, and has for its principal object, the provision of:
1. 2,6-dihydroxy-4-aminobenzoic acid,
2. Salts and esters of the aforesaid acid,
3. Methods of producing the aforesaid acid.

The soluble salts of the aforesaid acid, as for example, the sodium salt are especially valuable in chemotherapeusis, particularly as a tuberculostatic agent. The esters of the acid may be used in cases where it is preferred to avoid the employment of water as a solvent or vehicle for the pharmacophoric portion of the molecule.

The following preparation and examples are illustrative of a means for achieving the invention:

PREPARATION I

1,5-dihydroxy-3-aminobenzene

Twenty (20) grams of phloroglucinol (1,3,5-trihydroxy benzene) are placed in a round bottom flask with a side inlet tube and ground joint. On top of the flask an adapter with a narrow opening is placed in order to prevent backing in of air. The air in the flask is replaced by nitrogen, and 120 ml. of aqueous ammonia solution is introduced. The mixture is cooled in ice water and saturated with gaseous ammonia. After standing at room temperature for 36 hours, the flask is connected to a vacuum distillation system and the solution is concentrated at 40–50° under nitrogen. A white crystalline precipitate appears near the end of the distillation. The solution is concentrated as far as possible. It may be dried completely by transferring the flask into a vacuum desiccator containing concentrated sulfuric acid. Since the traces of water and ammonia present inevitably cause a considerable blackening of the material as soon as it comes in contact with oxygen of the air, it is more convenient, therefore, to add to the almost dry material in the flask at the end of the distillation approximately 40 cc. of 5N HCl which transforms the phloramine (1,5 - dihydroxy - 3 - aminobenzene) into its stable, yellow hydrochloride salt. Evaporation of such acidified solution results in the recovery of the hydrochloride of phloramine in an almost pure form, contaminated only with a trace of ammonium chloride, which does not interfere with its subsequent use.

EXAMPLE 1

2,6-dihydroxy-4-aminobenzoic acid

Into a steel cylinder of 450 ml. capacity (one which withstands a pressure up to 1800 p. s. i.) and closed with a needle valve, there are placed 50 grams of potassium bicarbonate, 120 grams of carbon dioxide (Dry Ice) and 12 grams of phloramine hydrochloride dissolved in 100 ml. water. After all the air has been expelled by the carbon dioxide vapors, the cylinder is closed and heated for 6 hrs. to 80° with shaking. After cooling, the pressure is released through the valve, and the semisolid liquid, containing crystals of the potassium salt of the new acid (2,6 dihydroxy-4-aminobenzoic acid) is transferred to a tall beaker. The cylinder is washed out with 20 ml. water. To the mixture, which is cooled in ice water, there is cautiously added concentrated hydrochloric acid with stirring, until the reaction is acid to Congo red. The new acid precipitates as a yellow to brown powder, which is filtered off after standing 1 hr. in ice water. It is dissolved in water with a slight excess potassium bicarbonate, treated at room temperature with little charcoal, filtered and the solution is again acidified. The acid comes down as a fine granular, yellow material. It is filtered off, washed with little cold water, and dried in the vacuum desiccator over concentrated sulfuric acid.

Assay: (Kjeldahl) Found __: 7.48, 7.33%.
Calculated for $C_7H_7O_4N.H_2O$ (M. W. 187.08) N: 7.49%.

The new acid dissolves in water to form a neutral solution with less than the calculated quantity of alkali due to the presence of the basic amino group. Thus titration in water to pH 7.2 calculated out to an equivalent molecular weight of 219.6.

Upon slow heating, the acid turns brown at 152–160° C., sinters and partly melts at 175–180° and decomposes and turns black above 230°. It does not melt completely.

EXAMPLE 2

2,6-dihydroxy-4-aminobenzoic acid sodium salt

Five (5) grams of the new acid of Example I were suspended in 20 ml. water, and powdered sodium bicarbonate was added to a slight excess. The acid went into solution and within a short time, the sodium salt thereof began to crystallize out. The mixture was chilled in ice water and the crystals were filtered off. They were washed with small amounts of ice cold water, until approximately one-half of the crystals had dissolved again. The remaining material was dried in a vacuum desiccator at room temperature over concentrated sulfuric acid. The new sodium salt forms an almost colorless powder, soluble in water. The pH of the aqueous solution is 7.5.

Assay: Found, Na 10.7%.
Calculated: C₇H₆O₄NNa.H₂O (M. W. 209.08) Na 11.0%.

TABLE I

[*Some reactions of 2,6-dihydroxy-4-aminobenzoic acid and its sodium salt.*]

|  | Acid | Na-Salt |
|---|---|---|
| FeCl₃ Solution | violet color | violet color. |
| FeCl₃+H₂O₂ |  | Red-brown color, precipitate on standing. |
| BaCl₂ | no precipitate | no precipitate. |
| AgNO₃ | Colorless gelatinous precipitate. | colorless gelatinous precipitate. |
| CuSO₄ | green color, no precipitate. | yellowish precipitate. |
| Pb-acetate, normal. | cloudy, no precipitate. | colorless gelatinous precipitate. |
| Fehling's solution | reduces upon heating |  |

It will be understood that the foregoing description is merely illustrative of the invention, and, accordingly, the appended claims are to be construed as defining the same within the full spirit and scope thereof.

I claim:

1. Compounds of the group consisting of 2,6-dihydroxy-4-amino benzoic acid and the alkali metal salts of said acid.

2. As a new composition of matter, 2,6-dihydroxy-4-amino benzoic acid.

3. An alkali metal salt of 2,6-dihydroxy-4-aminobenzoic acid.

4. The sodium salt of 2,6-dihydroxy-4-aminobenzoic acid.

5. Method of preparing 2,6-dihydroxy-4-aminobenzoic acid which comprises reacting 1,5-dihydroxy-3-aminobenzene with an alkali metal bicarbonate whereby an alkali metal salt of the aforesaid acid is produced.

6. Method in accordance with claim 5 wherein the reaction is effectuated at superatmospheric pressure.

7. Method of preparing 2,6-dihydroxy-4-amino benzoic acid which comprises reacting an aqueous solution of 1,5-dihydroxy-3-aminobenzene hydrochloride with potassium bicarbonate under pressure, thereby to form the potassium salt of 2,6-dihydroxy-4-amino benzoic acid, and acidifying said salt to obtain the free acid.

KARL SCHOEN.

REFERENCES CITED

The following references are of record in the file of this patent:

FOREIGN PATENTS

| Number | Country | Date |
|---|---|---|
| 12,191 | Great Britain | of 1889 |

OTHER REFERENCES

Meyer and Others, Beilstein (Handbuch, 4th ed.), vol. 14, pp. 634–636 (1931).

Hirt et al., Helv. Chim. Acta, vol. 32, p. 378 (1949).